Patented Oct. 10, 1922.

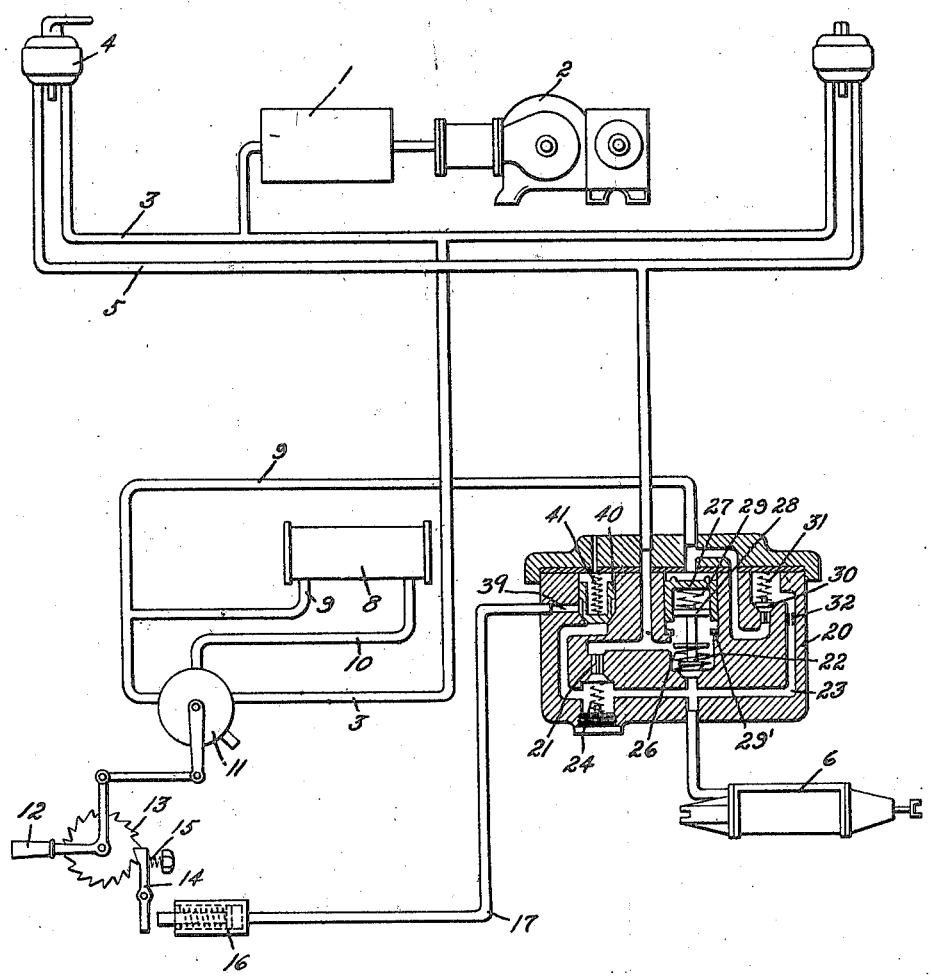

1,431,461

UNITED STATES PATENT OFFICE.

CHARLES A. IVES, OF ERIE, PENNSYLVANIA, ASSIGNOR TO GENERAL ELECTRIC COMPANY, A CORPORATION OF NEW YORK.

COMBINED CAR-DOOR CONTROL AND AIR-BRAKE EQUIPMENT.

Application filed November 7, 1921. Serial No. 513,337.

*To all whom it may concern:*

Be it known that I, CHARLES A. IVES, a citizen of the United States, residing at Erie, county of Erie, State of Pennsylvania, have invented certain new and useful Improvements in Combined Car-Door Control and Air-Brake Equipments, of which the following is a specification.

My invention relates to combined car door control and air brake equipments and the object of my invention is to provide an improved interlocking arrangement whereby the car doors can not be opened until the brakes are applied.

My invention will be better understood from the following description taken in connection with the accompanying drawing, and its scope will be pointed out in the appended claims.

Referring to the accompanying drawing which shows one embodiment of my invention, 1 represents a reservoir supplied with fluid pressure from a compressor 2 and connected to a main reservoir pipe 3 of a straight air brake system. I wish it to be understood, however, that my invention is not limited to a straight air brake system as it will be obvious to one skilled in the art that it is applicable to any other type of air brake system.

4 represents a motorman's brake valve for controlling the supply and release of fluid pressure to the straight air pipe 5 which is connected to the brake cylinder 6. The brake valve 4 may be of any suitable construction so that in its application position it connects the main reservoir pipe 3 to the straight air pipe 5 and in its release position it connects the straight air pipe 5 to atmosphere.

8 represents a door engine which is provided with the door opening pipe 9 and the door closing pipe 10. The door engine is arranged so that when fluid under pressure is admitted to the door opening side thereof and the door closing side is connected to atmosphere the door engine operates to open the car doors controlled thereby and when fluid under pressure is admitted to the door closing side and the door opening side is connected to atmosphere the door engine operates to close the car doors controlled thereby. The supply of fluid pressure to the door opening pipe 9 is controlled by a manually operated door valve 11 which is so arranged that it connects the door opening pipe 9 to the main reservoir pipe 3 and the door closing pipe to atmosphere in its door opening position and connects the door opening pipe 9 to atmosphere and the door closing pipe to the main reservoir pipe 3 in its door closing position. The door valve 11 is arranged to be operated by a movable handle 12. This handle is provided with any suitable locking means, such as a ratchet 13 and pawl 14 which is held in engagement with the ratchet 13 by a spring 15, so that normally the door valve can not be moved in a direction to open the doors. The pawl 13 is arranged to be moved out of engagement with the ratchet 13 so that the door valve may be moved into its door opening position, by means of a piston 16 which is arranged to release the pawl when fluid pressure is supplied to a pipe 17.

For interlocking the air brakes and the car doors so that the doors can be opened only when the brakes are applied and the brakes can not be released when the doors are opened, I provide the interlocking valve device 20. This valve device 20 comprises a check valve 21 and a lift valve 22 which control the communication between the straight air pipe 5 and the passage 23 which is connected to the brake cylinder 6. The check valve 21 is normally held in its closed position by a spring 24. This valve, however, is arranged so that it opens and establishes communication between the straight air pipe 5 and the brake cylinder passage 23 when the pressure in the straight air pipe exceeds the pressure in the brake cylinder by a predetermined amount. The valve 22 is normally held in its open position by means of a spring 26. This valve is controlled by means of the telescoping piston 27 which is connected to the valve 22 by a piston stem 28 and a spring 29 which is interposed between the piston and the stem so that when the piston moves down and seats the valve, the piston can travel a small distance further and seat against the leather gasket 29' thereby preventing any leakage around the piston. One side of the piston 27 is subject to the pressure in the door opening pipe 9 and the other side is subject to the pressure in the straight air pipe 5. A check valve 30 controls the communication between the door opening pipe 9 and the brake cylinder passage 23. This valve 30 is normally held in its closed position by means of a spring 31 and is arranged to open and establish communication between the door opening pipe 9 and the brake cylinder passage 23 through a restricted port 32 when the pressure in the door opening pipe exceeds the pressure in the brake cylinder passage 23.

The interlocking valve 20 is also provided with a loaded valve 40 which controls the supply of fluid pressure to the pipe 17. This valve 40 is normally held in its closed position by means of a spring 41. One side of the valve 40 is subject to atmospheric pressure and a portion of the other side is subject to the pressure in the brake cylinder passage 23 and another portion of the latter side is subject to the pressure in the passage 39. This valve 40 is arranged to establish communication between the brake cylinder passage 23 and the pipe 17 when the brake cylinder pressure reaches a predetermined value.

The operation of the embodiment of my invention shown in the drawing is as follows: The air brakes are applied and released in the usual manner by means of the brake valve 4. When the brakes are released the loaded valve 40 is closed. Therefore the valve piston 16 is out of engagement with the pawl 14 so that the door valve handle 12 which is in its door closing position cannot be moved into its door opening position.

When the brakes are applied fluid is supplied through the straight air pipe 5 and the brake cylinder passage 23 to the brake cylinder 6. If the brake cylinder pressure builds up to a predetermined value the loaded valve 40 opens and establishes communication between the brake cylinder passage 23 and the pipe 17. Fluid then flows to one side of the piston 16 and operates it so that the pawl 14 is moved out of engagement with the ratchet 13. The handle 12 may now be operated so as to move the door valve 11 into its door opening position to open the car doors. Since the handle 12 cannot be moved into its door opening position until the brake cylinder pressure is above a predetermined value it is evident that the car doors can be opened only when the brakes are applied.

Since the pressure in the door opening pipe 9 is the same as the pressure in the main reservoir pipe when the doors are open, this pressure also causes the piston 27 to move downwardly if less than a predetermined straight air application of the brakes is made. This downward movement of the piston closes the valve 22 so that if the brake valve 4 is moved to its release position, in which position the straight air pipe 5 is connected to atmosphere, the fluid pressure in the brake cylinder is not exhausted. Consequently, the brakes cannot be released while the doors are open.

The check valve 21 permits fluid to flow from the straight air pipe 5 to the brake cylinder passage 23 so as to maintain the brake cylinder pressure against leakage while the brake valve is in its application position and the doors are opened. If, however, the brake valve is moved to its release position so that the supply of fluid pressure to the straight air pipe 5 is cut off while the doors are open the brake cylinder pressure is still maintained by means of check valve 30 which establishes communication between the door opening pipe 9 and the brake cylinder passage 23 through the restricted passage 32.

When the door valve 11 is moved to its door closing position to close the car doors the door opening pipe 9 is connected to atmosphere so that the valve 22 operates and establishes communication between the straight air pipe 5 and the brake cylinder passage 23. The brakes may then be released by moving the brake valve 4 to its release position, in which position the straight air pipe is connected to atmosphere so that fluid pressure is vented from the pipe 17 and the piston 16 is restored to its normal position. Since the brakes can only be released when the door valve 11 is in its door closing position, it is evident that the door valve is always locked in its door closing position. When the brake cylinder pressure decreases below a predetermined value the loaded valve 40 closes and cuts off communication between the pipe 17 and the brake cylinder passage 23.

While I have shown and described one embodiment of my invention, I do not desire to be limited thereto but seek to cover in the appended claims all those modifications that fall within the true spirit and scope of my invention.

What I claim as new and desire to secure by Letters Patent of the United States, is,—

1. In a combined car door control and air brake equipment, the combination with a brake cylinder, a motorman's brake valve for controlling the supply of fluid pressure to said brake cylinder to apply and release the brakes, and a door valve for controlling the car doors, of means for preventing the movement of said door valve while the brakes are released.

2. In a combined car door control and air brake equipment, the combination with a brake cylinder, a motorman's brake valve for controlling the supply of fluid pressure to said brake cylinder to apply and release the brakes, and a door valve for controlling the car doors, of means for normally locking said door valve against movement into its door opening position and operated upon an application of the brakes for releasing said door valve to permit the movement of the same into its door opening position.

3. In a combined car door control and air brake equipment, the combination with a brake cylinder, a motorman's brake valve for controlling the supply of fluid pressure to said brake cylinder to apply and release the brakes, and a door valve for controlling the car doors, of means for normally locking said door valve against movement into its door opening position and a piston arranged to be operated by fluid pressure supplied when the brakes are applied for releasing said locking means.

4. In a combined car door control and air brake equipment, the combination with a brake cylinder, a motorman's brake valve for controlling the supply of fluid pressure to said brake cylinder to apply and release the brakes, and a door valve for controlling the car doors, of means for normally locking said valve against movement into its door opening position, a piston arranged to be operated by fluid pressure for releasing said locking means, and means arranged to supply fluid pressure to said piston only while the brakes are applied and to prevent the release of the brakes while the doors are open.

In witness whereof, I have hereunto set my hand this 4th day of November, 1921.

CHARLES A. IVES.